US010759140B1

(12) United States Patent
    Miller

(10) Patent No.: US 10,759,140 B1
(45) Date of Patent: Sep. 1, 2020

(54) COMPOSITE DAMAGE TOLERANCE AND THROUGH THICKNESS CONDUCTIVITY BY INTERLEAVING CARBON FIBER VEIL NANOCOMPOSITES

(71) Applicant: The United States of America as represented by the Administrator of the National Aeronautics and Space Administration, Washington, DC (US)

(72) Inventor: Sandi Miller, Northfield, OH (US)

(73) Assignee: United States of America as Represented by the Admin of the National Aeronautics and Space Administration, Washington, DC (US)

( * ) Notice: Subject to any disclaimer, the term of this patent is extended or adjusted under 35 U.S.C. 154(b) by 1249 days.

(21) Appl. No.: 14/275,144

(22) Filed: May 12, 2014

Related U.S. Application Data

(60) Provisional application No. 61/824,570, filed on May 17, 2013.

(51) Int. Cl.
    *B32B 5/02* (2006.01)
    *B32B 37/14* (2006.01)
(52) U.S. Cl.
    CPC ............ *B32B 5/022* (2013.01); *B32B 37/144* (2013.01); *B32B 2305/08* (2013.01);
    (Continued)
(58) Field of Classification Search
    CPC ........... B82Y 30/00; B82Y 40/00; B82Y 5/00; B82Y 99/00; D06M 11/74; D06M 2101/40; D06M 11/45; D06M 11/79; D06M 15/233; D06M 15/263; D06M 15/55; B29C 70/025; B29C 70/52; B29C 70/12; B29C 70/24; B29C 70/36; B29C 70/44; B29C 70/48; B29C 70/502; B29C 70/521; C01B 31/0206; C01B 13/32; C01B 31/02; C01B 31/0226; C01B 31/0293; C08J 5/005; C08J 5/042; C08J 2361/00; C08J 2363/00; C08J 3/075; C08J 5/043; C08J 5/06; C08J 5/08; C08J 5/24; C08J 9/00; A61L 2400/12;
    (Continued)

(56) References Cited

U.S. PATENT DOCUMENTS

2011/0049292 A1   3/2011   Kruckenberg et al.
2011/0144559 A1   6/2011   Lafdi et al.
                 (Continued)

*Primary Examiner* — Brian Handville
(74) *Attorney, Agent, or Firm* — Robert H. Earp, III; William M. Johnson

(57) ABSTRACT

A polymer matrix composite includes layers that alternate between a thin carbon fiber veil layer and a thicker base carbon fiber reinforcement layer. Each veil is coated with conductive carbon nanotubes (CNTs) prior to being added as a laminate layer. Epoxy resin fixes CNTs extended into adjacent reinforcement layers, which results in a composite improved in interlaminar strength, fracture toughness, and impact resistance. Thermal and electrical conductivity are also improved due to the conductive CNTs bridging the resin-insulating interlayer region. As the fuzzy fiber veil is not relied on to provide strength or stiffness to the composite structure, any damage to the veil will not affect composite integrity. Also, as the CNT growth is not on a replacement section of reinforcement layer, the composite avoids pitfalls of strength degradation, reinforcing phase continuity disruption, and residual stress introduction.

20 Claims, 1 Drawing Sheet

(52) U.S. Cl.
CPC ... *B32B 2307/202* (2013.01); *B32B 2307/302* (2013.01); *B32B 2309/105* (2013.01); *B32B 2311/08* (2013.01); *B32B 2311/12* (2013.01); *B32B 2311/22* (2013.01); *B32B 2313/04* (2013.01); *B32B 2398/00* (2013.01); *B32B 2605/18* (2013.01)

(58) Field of Classification Search
CPC ...... A61L 29/02; A61L 29/123; A61L 29/126; A61L 31/122; A61L 31/125; A61L 31/14; B29K 2063/00; B29K 2105/124; B29K 2105/167; B29K 2505/00; B29K 2509/00; B29K 2707/04; B29K 2995/0078; Y10T 428/25; Y10T 442/20; Y10T 29/49115; Y10T 428/1369; Y10T 428/23993; Y10T 428/24; Y10T 428/249924; Y10T 428/24994; Y10T 428/26; Y10T 428/268; Y10T 428/2918; Y10T 428/292; Y10T 428/2933; Y10T 428/298; Y10T 428/31504; Y10T 428/31678; Y10T 428/31935; Y10T 442/10; Y10T 442/2008; Y10T 442/3065; Y10T 442/60; Y10T 442/609; A61M 1/008; A61M 1/3653; A61M 1/3655; A61M 2025/0037; A61M 2025/006; A61M 2210/101; A61M 25/0009; A61M 25/25; A61M 25/001; A61M 25/0012; A61M 25/0026; A61M 25/0043; A61M 27/002; A61M 27/006; B32B 2250/20; B32B 2250/42; B32B 2260/023; B32B 2260/046; B32B 2262/106; B32B 2305/076; B32B 2305/77; B32B 2307/202; B32B 5/02; B32B 5/28; B32B 5/022; B32B 37/144; B32B 2313/04; B32B 5/12; B32B 5/26; B32B 2305/08; B32B 2307/305; B32B 2605/18; B32B 2311/08; B32B 2309/105; B32B 2311/22; B32B 2398/00; B32B 2311/12
See application file for complete search history.

(56) References Cited

U.S. PATENT DOCUMENTS

| | | |
|---|---|---|
| 2011/0240621 A1 | 10/2011 | Kessler et al. |
| 2011/0281034 A1 | 11/2011 | Lee et al. |
| 2012/0071586 A1 | 3/2012 | Thunhorst et al. |
| 2012/0135219 A1 | 5/2012 | Graham |
| 2012/0164903 A1 | 6/2012 | Wardle et al. |
| 2013/0071565 A1 | 3/2013 | Malecki et al. |
| 2013/0072077 A1 | 3/2013 | Steiner, III et al. |
| 2013/0089769 A1 | 4/2013 | Proctor et al. |
| 2013/0153830 A1 | 6/2013 | Sao et al. |
| 2013/0216390 A1 | 8/2013 | Younes et al. |

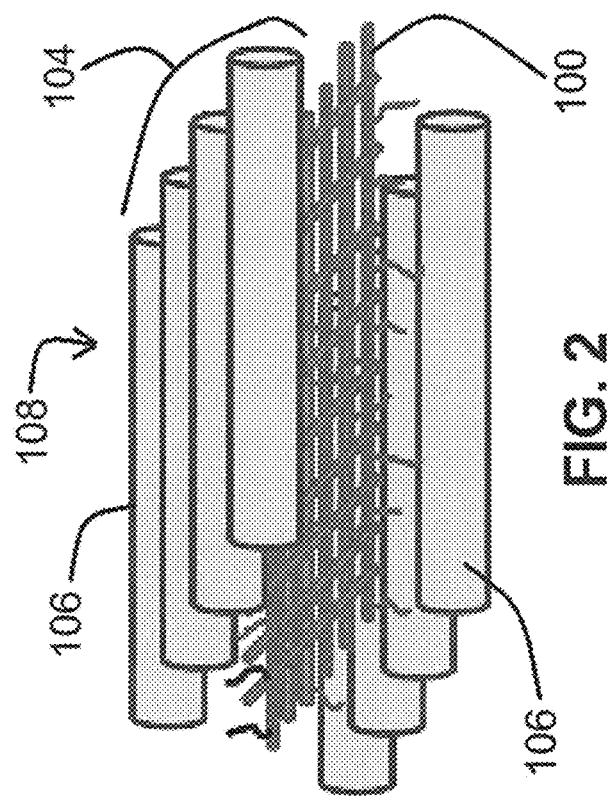
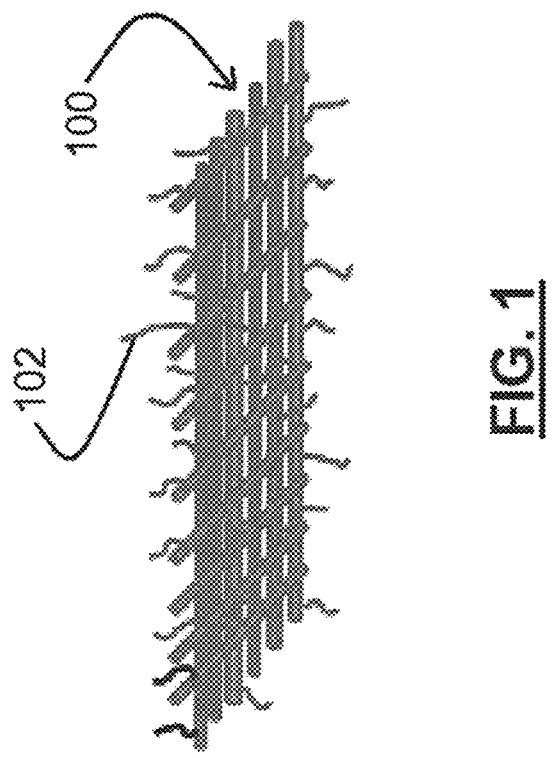

COMPOSITE DAMAGE TOLERANCE AND THROUGH THICKNESS CONDUCTIVITY BY INTERLEAVING CARBON FIBER VEIL NANOCOMPOSITES

CROSS REFERENCE TO RELATED APPLICATION

This application claims benefit pursuant to 35 U.S.C. § 119(e) of U.S. provisional application 61/824,570 filed May 17, 2013, which is herein incorporated by reference in its entirety.

ORIGIN OF THE INVENTION

The invention described herein was made by an employee (or employees, as appropriate) of the United States Government and may be manufactured and used by or for the Government for Government purposes without the payment of any royalties thereon or therefore.

BACKGROUND OF THE INVENTION

Composite materials can be used to provide components with favorable properties. A wider range of applications may benefit from improvements in composites and techniques for making them.

SUMMARY OF THE INVENTION

An exemplary embodiment of the invention includes an improved composite structure.

An exemplary embodiment includes a polymer matrix composite (PMC) that comprises fiber veils coated with nanotubes.

An exemplary embodiment includes a composite that comprises alternating layers of fiber reinforcement and fiber veils coated with nanotubes.

An exemplary embodiment includes a composite that comprises alternating layers of carbon fiber reinforcement and thin flexible carbon fiber veils coated with carbon nanotubes.

An exemplary embodiment includes a composite material that provides an improved increase in material properties related to shear, fracture toughness, and impact resistance.

An exemplary embodiment includes a method of preparing the improved composite structure.

Another exemplary embodiment comprises a component that includes the improved composite structure.

BRIEF DESCRIPTION OF THE DRAWINGS

FIG. 1 illustrates an exemplary fuzzy fiber veil substrate that includes CNTs grown from its surface.

FIG. 2 illustrates a segment of an exemplary composite in which the exemplary fuzzy fiber veil of FIG. 1 is positioned as an interleaf in the inter-layer region located between adjacent fiber reinforcement layers of the laminate structure.

DETAILED DESCRIPTION OF EXEMPLARY EMBODIMENTS

It will be readily understood that the features of exemplary embodiments may be arranged and designed in a wide variety of different configurations. Thus, the following detailed description of the exemplary embodiments of apparatus and method is not intended to limit the scope of the invention as claimed, but is merely representative of selected exemplary embodiments that implement the principles described herein.

The features, structures, and/or characteristics described herein may be combined in any suitable manner in one or more embodiments or arrangements. That is, a particular feature, structure, or characteristic described in connection with one embodiment may be included in at least one other embodiment or arrangement.

An exemplary embodiment is directed to forming a polymer matrix composite (PMC) that includes thin flexible carbon fiber veils coated with carbon nanotubes (CNTs). The composite is formed by adding alternating layers of veils and carbon fiber/epoxy prepreg reinforcement. The veils are located in the inter-layer regions between adjacent layers of carbon fiber reinforcement. The CNTs are grown ex situ directly on a respective veil substrate prior to the veil being placed as an interleaving layer against a pre-impregnated reinforcement layer. After a predetermined number of layers are added, the composite can be cured. The resultant composite provides an improved increase in material properties that are dependent on interlaminar strength, such as shear, fracture toughness, and impact resistance.

Alternative approaches can be used in making the composite. For example, a Resin Transfer Molding (RTM) process can be used with the material. The process can include stacking the veil against dry carbon fibers and flowing epoxy over the entire structure.

In an exemplary embodiment the CNTs are grown from both sides of a non woven carbon fiber mat. The mat thickness can vary. For example, a mat may have an original thickness of up to approximately 0.15 mm in a Z-direction. It should be understood that different mat thicknesses can be used in different embodiments. A mat can also have plural rows of fibers that extend substantially perpendicular to other plural rows of fibers. Relative to the thicker fiber reinforcement layers, the thin mat can have the appearance of comprising substantially flat sides.

The grown CNTs can be single or multi walled. The nanotube diameter can vary. For example, a single-walled nanotube may have a relatively small diameter of approximately one nanometer. The CNTs can be grown to predetermined lengths. It should be understood that different nanotube dimensions (e.g., diameters, lengths, etc.) can be used in different embodiments.

The grown CNTs cause opposite sides of a veil to have fuzzy surfaces, which results in a fuzzy fiber veil. The grown CNTs do not affect the flexibility of the veil. The veil, which includes the mat and the CNTs, is then added as a veil layer during the composite forming. The thinness of the veils enables them to be situated between fiber reinforcing layers while avoiding interlaminar discontinuity in the reinforcement. As can be appreciated, the layering process allows the CNTs to be added in a manner that does not disrupt the continuity of the base carbon fiber reinforcement. For example, the interleaved approach of the exemplary embodiment allows for beneficial CNT addition without resorting to replacing sections of the base carbon fiber reinforcement in order to add the CNTs, especially when such replacement can result in degraded composite strength. Such section replacement can also introduce coefficient of thermal expansion (CTE) mismatch and residual stresses into the structure. Furthermore, in contrast to replacing a section of a fiber reinforcing layer in the composite, the exemplary methods of making a polymer matrix composite do not require that the ply thickness of the fuzzy fiber veils be comparable to the cure ply thickness of a fiber reinforcing layer. Rather, in an exemplary embodiment the veil is thinner than the cure ply thickness of the reinforcing layer, which allows the veil to sit in the resin layer that exists between plies.

During the layering process, outer ends of some CNTs extend into adjacent carbon fiber reinforcement layers. However, prior to applying the polymer matrix resin, no veil is mechanically nor covalently fastened to any reinforcement layer. That is, because a sufficient density of CNTs extend a sufficient distance into the reinforcement layers, a veil can be maintained between adjacent woven reinforcement layers during assembly without any need of mechanical fasteners or chemical bonding. Thus, the layering process allows the composite to be quickly assembled.

Curing fixes (hardens) outer ends of CNTs (which extend from both sides of the veil) in the adjacent reinforcement layers. That is, the fixed ends of these CNTs essentially stitch and bind adjoining reinforcement layers together, which further contributes to the composite having an increase in interlaminar strength. The (non mechanical) stitching also assists in preventing delamination. The exemplary veil interleave approach can be used to improve durability of any structurally-loaded polymer matrix composite. The exemplary veils allow for the production of composites that are reinforced with a fibrous material and further strengthened by carbon nanotubes.

Because the veils are substantially located in the inter-layer regions where cured resin is also located, the veils themselves do not impart strength or stiffness to the composite structure. Thus, as can be appreciated, any damage to the veils would not affect integrity of the composite structure. In an exemplary composite embodiment, the interleaved veil layers do not add nor subtract from the reinforcement continuity of the base fiber layers.

FIG. 1 shows an exemplary fuzzy fiber veil substrate 100 that includes CNTs 102 grown from its surfaces. FIG. 2 shows an exemplary composite portion in which the fuzzy veil 100 is an interleaf between adjacent layers 104 of fiber reinforcement 106 within a laminate structure 108. The CNTs, which partly reside in the interlaminar region within the matrix resin, act to non-covalently "stitch" together plies of the composite. The extended CNTs are configured and positioned to effectively pin together the adjacent reinforcement layers, which results in fracture delay. The combination of FIG. 1 and FIG. 2 illustrate an exemplary interleave technique for making a composite that includes alternating laminate layers of fiber reinforcement 106 and fuzzy veils 100 (with grown nanotubes).

A resulting exemplary composite can comprise a plurality of adjacent carbon fiber reinforcement layers with a respective inter-layer region therebetween. At least one fuzzy fiber veil is situated in the inter-layer region. CNTs of the veil extend into both of the adjacent reinforcement layers. Curing produces a resultant composite that has enhanced properties and features, as previously discussed.

A resultant composite material (e.g., a fiber-reinforced resin material) also has an increase in thermal and electrical conductivity as a result of the incorporated veils. The grown CNTs are conductive. The generated nanotube loading is high enough to create a thermal conductive pathway throughout the material. For example, in some exemplary embodiments the grown nanotubes overlap. Additionally, the base mat substrate and/or the CNTs can be coated with metal particles to further increase the thermal and electrical capacity of the veil. Such metal particles can include Ag, Ni, and/or Cu, etc.

Applied curable epoxy resin may negatively provide a composite with (non-conductive) insulating properties. The applied resin flows to fill voids in the inter-layer regions. Thus, the resin may produce an insulating-rich inter-layer region. However, because of the thinness of an exemplary veil (and the closeness of its opposite sided CNTs), electricity can pass (or jump) from conductive CNTs on one side of the veil to conductive CNTs on the other side of the veil. That is, the exemplary CNTs conductively bridge the entire resin-filled, non-conductive, inter-layer region. As a result, the exemplary veils provide the inter-layer region with thermal and electrical conductivity in the Z-direction.

Conductive CNTs from a first veil (which is located on one side of an adjacent carbon fiber reinforcement layer) extend a sufficient distance into the reinforcement layer. Likewise, conductive CNTs from a second veil (which is located on the opposite side of the reinforcement layer) also extend a sufficient distance into the reinforcement layer. Because the sufficient distances that these extended CNTs (from different veils) oppositely protrude into the same reinforcement layer, electricity can pass (or jump) between the different veils (via the CNTs thereof) in the Z-direction. That is, the CNTs also allow a reinforcement layer to be conductively bridged in the Z-direction. As previously discussed, the veils also provide Z-direction conductively through the inter-layer regions. As a result, the veils can provide conductively in the Z-direction throughout the entire the composite. That is, an exemplary composite provides through thickness conductivity (both thermal and electrical).

Exemplary embodiments also allow for variations to be easily made to the CNT veil. For example, the grown CNTs can be unfunctionalized or functionalized to provide chemical or electrostatic bonding with the matrix material. As already discussed, a metal coating may be applied. The carbon veil nanocomposite may also be used in conjunction with alternative or additional interlayer toughening materials, such as thermoplastic veils.

Resin can be applied (or injected) to the laminate structure using conventional techniques. For example, resin application processes can include resin transfer or infusion (e.g., vacuum assisted), compression molding, etc. In some embodiments a pultrusion process may be allowed. The infusion process can result in a chemically and/or physically bonded laminate structure. Infusing may also be referenced herein as impregnating, infiltrating, etc.

The exemplary approach of forming a polymer matrix composite also enables a predetermined amount of CNTs to be selectively located at predetermined locations in the composite. That is, the exemplary embodiments for making a polymeric matrix composite allow for fuzzy fiber substrates, which have nanotubes grown directly thereon, to be selectively placed within the laminate structure. This allows for a component to comprise the exemplary composite only at needed locations. For example, a component may include several layers of base carbon fiber reinforcement but the nanocomposite veils are only situated (between reinforcement layers) in certain sections of the component, instead of being situated over the entire component area. An exemplary fuzzy fiber veil can be viewed as an additive that is provided (introduced) during the laminate formation.

Besides the economic benefits, the processing abilities allow veils to be selectively used only in certain areas of a part that are likely to be subject to impacts. For example, veils can be selectively situated at a leading edge of a wind turbine blade, a helicopter blade, an engine component (e.g., a fan blade), an air foil, an aircraft nose section, or other structure that is likely to be impacted by objects during operation. Thus, a component structurally loaded with an exemplary polymer matrix composite comprises improved damage tolerance.

The electrically conductive nature of the nanocomposite veils also allows their application (and the polymer matrix composite) in lightning strike protection. For example, a component may include several layers of base carbon fiber reinforcement but the nanocomposite veils may only need to be selectively situated at the outer surface of the component. Some exemplary nanocomposite applications include lightning strike protection for aircraft and/or wind turbines. Composite aircraft structures that previously relied upon a heavy metal such as copper for lightning protection, can now obtain the protection through the relatively lighter (in weight) exemplary nanocomposite. The electrically conductive nanocomposites also allow their usage in other types of protection applications, such as electromagnetic (EM) and electromagnetic pulse (EMP) protection. Thus, the exemplary nanocomposite additionally provides economic benefits.

The thermally conductive nature of the nanocomposite veils also allows their application (and the polymer matrix composite) in heat transfer environments. For example, applications can include composite gear boxes for roto-craft. Not only can heat be efficiently transferred, but the components using the exemplary nanocomposite can also be lighter in weight. As can be appreciated, the expanded functionality introduced through utilization of metal coated veils and/or nanotubes in the exemplary composite also allows for the composite to be used in additional applications that involve thermal and/or electrical conductivity.

As previously discussed, carbon nanotubes (CNTs) can be used in carbon fiber veils. The CNTs can be grown (ex situ) directly on a veil substrate. However, the veil features allow for different embodiments. For example, a veil substrate may comprise a growth substrate, an intermediate material associated with carbon-based nanostructure precursors, and a nanopositor that promotes the growth of carbon-based nanostructures from the precursors.

It should be understood that other veil substrate materials and other nanotube materials can also be used. That is, in different embodiments different materials can be used for the veil substrate and the nanotubes. For example, a veil substrate can comprise silicon carbide, boron nitride, and/or glass, etc. Also, the nanotubes (grown from a veil) can comprise boron nitride, etc. For example, boron nitride nanotubes can be grown from a silicon carbide veil. Such a veil (comprising boron nitride nanotubes grown on a silicon carbide substrate) can likewise be used as an interleave in an exemplary composite to increase the through-thickness (thermal) conductivity of the composite. Other carbon nanostructures (CNSs) may also be used.

The exemplary methods discussed herein for processing a nanotube-containing polymer matrix composite provide an easy way of incorporating a high loading of nanotubes into the polymer structure. The processing can be conducted without having to manage difficult processing issues associated with nanoparticle dispersion. For example, epoxy resin that has nanotubes dispersed therein can be very viscous and difficult to process. As can be appreciated, the exemplary processing methods allow for nanotube-free epoxy resin to easily flow over already positioned veil layers. As a result, the exemplary methods of preparing the composite can generate the same nanoparticle benefits without sacrificing processability.

The exemplary embodiments allow for polymer matrix composites (e.g., a composite based on carbon fiber and epoxy resin) to be used in an increasing number of applications. Regardless of the application, the interlaminar strength and fracture toughness of the polymer matrix composite are improved. As a result, improved damage tolerance (e.g., with regard to impact resistance) is achieved.

An exemplary method of making an exemplary polymer matrix composite includes obtaining a plurality of nanocomposite veils. Each respective veil comprises a respective flexible non-woven carbon fiber mat. Each mat comprises a first side surface and a second side surface, where the first side surface is opposite the second side surface. Both the first side surface and the second side surface extend in both an X-direction and a Y-direction. Each mat has a thickness in a Z-direction. The Z-direction is substantially perpendicular to both the X-direction and the Y-direction. An exemplary mat thickness is in the range of 100-150 microns. Each respective veil includes carbon nanotubes (CNTs) grown directly on the first side surface and the second side surface, resulting in a fuzzy fiber veil. CNTs extend in the Z-direction from the first side surface and the second side surface. The CNTs are dispersed in a manner that causes the respective veil to be thermally and electrically conductive in each of the X, Y, and Z directions.

Subsequent to obtaining the veils, the exemplary method further includes creating alternating layers of respective veils and respective reinforcement layers of woven base carbon fiber. The alternating layers form laminate subassemblies. Each formed laminate subassembly comprises a respective veil located between adjacent reinforcement layers.

Forming a respective laminate subassembly includes relatively moving the first side surface of the respective veil against a first reinforcement layer. The mat of the veil is thinner (in the Z-direction) than the first reinforcement layer. CNTs that are extended from the first side surface extend into the first reinforcement layer. The moving causes the veil and the first reinforcement layer to be placed in contact with each other, with the veil being neither mechanically nor covalently fastened to the first reinforcement layer.

The forming of the respective laminate subassembly further includes, while the veil is still neither mechanically nor covalently fastened to the first reinforcement layer, relatively moving a second reinforcement layer of the laminate subassembly against the second side surface of the veil. The mat of the veil is thinner (in the Z-direction) than the second reinforcement layer. CNTs extended from the second side surface extend into the second reinforcement layer. The moving causes the veil and the second reinforcement layer to be placed in contact with each other, with the veil being neither mechanically nor covalently fastened to the second reinforcement layer. The moving also causes the first reinforcement layer and the second reinforcement layer to be non-covalently connected through the CNTs. The moving further causes the mat to be positioned as an interleaf in an inter-layer region of the laminate assembly.

Subsequent to creating the alternating layers, the exemplary method further includes, while the veil is still neither mechanically nor covalently fastened to either the first reinforcement layer nor the second reinforcement layer in any of the laminate subassemblies, applying a curable resin material to the alternating layers. The applying causes the resin material to reach each inter-layer region.

Subsequent to applying the resin material to the alternating layers, the exemplary method further includes allowing the resin to cure. As a result, the polymer matrix composite is formed.

In each respective laminate assembly of the formed polymer matrix composite, the veil is fixed relative to the first reinforcement layer and the second reinforcement layer. Furthermore, in each respective laminate assembly the first reinforcement layer, the second reinforcement layer, and the resin each comprise a load bearing component. The veil is configured and positioned to impart an increase in impact resistance to the load bearing components, but the veil itself is a non load bearing component in the laminate assembly. Also, the veil is configured and positioned such that continuity of the base carbon fiber of each reinforcement layer is absent disruption. The veil conductivity causes the interlayer region in the Z-direction to be conductively-bridged both thermally and electrically. Also, the CNTs of veils in adjacent laminate assemblies extend a distance into the reinforcement layers thereof at a density that allows electricity to flow between the veils in the Z-direction. The configuration, positioning, and conductive properties of the veils cause the polymer matrix composite to be thermally and electrically conductive in each of the X-direction the Y-direction, and the Z-direction, which allows use of the polymer matrix composite in lightning strike protection.

It should be understood that other embodiments of the exemplary composite material can be made by other methods that involve other steps or other arrangements of steps. These other methods can also result in a polymer matrix composite including interleaved CNT-bearing veils.

An exemplary polymer matrix composite product can be produced by the above described process of making (e.g., a product by process). Also, a resultant exemplary polymer matrix composite can comprises the properties, features, attributes, and relationships discussed in the previously described subject matter, including the above described process of making.

It should also be understood that in other embodiments the CNT/veil can be used in just a resin, with no reinforcing carbon fibers. Such other embodiments can include applications where the strength of continuous carbon fibers is not necessary. The veil with CNTs can be used without the carbon fibers, just as a nanocomposite. The ability to use the CNT/veil in such applications is a further exemplary feature thereof.

Thus, the novel composite structure and the method of preparing a composite material with the exemplary structure achieves at least one of the above stated objectives, eliminates difficulties encountered in the use of prior devices and systems, solves problems, and attains the desirable results described herein.

It should be understood that fabrication and methods of making an exemplary composite, as discussed above, may also be practiced in steps of a different order, and/or with elements in configurations which are different than those discussed. Thus, although the exemplary arrangements have been described based upon preferred embodiments, certain modifications, variations, and alternative constructions are also within the spirit and scope of the principles described herein.

In the foregoing description, certain terms have been used for brevity, clarity, and understanding. However, no unnecessary limitations are to be implied therefrom because such terms are for descriptive purposes and are intended to be broadly construed. Moreover, the descriptions and illustrations herein are by way of examples and the invention is not limited to the details shown and described.

In the following claims, any feature described as a means for performing a function shall be construed as encompassing any means capable of performing the recited function, and shall not be limited to the particular means used for performing the function in the foregoing description, or mere equivalents.

Having described the features, discoveries and principles of the invention, the manner in which it is constructed and operated and the advantages and useful results attained, the new and useful structures, devices, elements, arrangements, parts, combinations, systems, equipment, operations, methods, processes, and relationships are set forth in the appended claims.

I claim:

1. A method comprising:
providing a first veil substrate having a first surface and a second surface, wherein the veil substrate is constructed of first plurality of interwoven carbon fibers;
growing carbon nanotubes directly on the first and second surfaces such that longitudinal axes of individual ones of the carbon nanotubes extend substantially perpendicular to and away from the first and second surfaces;
providing a first reinforcement layer constructed of a second plurality of carbon fibers;
positioning the first veil substrate with respect to the first reinforcement layer such that at least a portion of the carbon nanotubes extending from the first surface protrude into the first reinforcement layer so as to maintain the relative positioning between the first veil substrate and the first reinforcement layer without any chemical bonding therebetween;
providing a second reinforcement layer constructed of a third plurality of carbon fibers;
while the first veil substrate is neither mechanically nor covalently fastened to the first reinforcement layer, positioning the first veil substrate with respect to the second reinforcement layer such that at least a portion of the carbon nanotubes extending from the second surface protrude into the second reinforcement layer, wherein the first plurality of carbon fibers are the only carbon fibers separating the first reinforcement layer from the second reinforcement layer; and
curing a resin applied to at least one of the first veil substrate, the first reinforcement layer, and the second reinforcement layer to form a composite material.

2. The method of claim 1, wherein the first veil substrate has a thickness between 100 microns and 150 microns.

3. The method of claim 2, wherein the first veil substrate is substantially planar, wherein the carbon nanotubes are electrically conductive such so as to provide conductive pathways along and between the first and second surfaces.

4. The method of claim 3, wherein the first veil substrate, first reinforcement layer, and second reinforcement layer form a first laminate assembly, wherein the method further comprises adding a plurality of additional laminate assemblies on either side of the first laminate assembly prior to curing the resin.

5. The method of claim 4, wherein, in the composite material, carbon nanotubes extending from adjacent veil substrates extend into reinforcement layers disposed between the adjacent veil substrates so as to provide conductive pathways between successive veil substrates.

6. The method of claim 5, further comprising, prior to curing the resin, adding a plurality of successive reinforcement layers without veil substrates therebetween to create a region not containing carbon nanotubes within the composite material.

7. The method of claim 4, further comprising injecting the resin into the first laminate assembly via one of resin transfer, vacuum-assisted infusion, compression molding, and pultrusion.

8. The method of claim 1, wherein the first and second reinforcement layers are pre-impregnated with the resin prior to being positioned with respect to the veil substrate.

9. The method of claim 1, further comprising functionalizing the carbon nanotubes on the veil substrate to provide chemical or electrostatic bonding with the resin.

10. The method of claim 1, further comprising coating the veil substrate with a metal coating prior to positioning the veil substrate with respect to the first and second reinforcement layers.

11. The method of claim 1, wherein the carbon nanotubes are multi-walled.

12. The method of claim 1, wherein the veil substrate is thinner than the first and second reinforcement layers.

13. The method of claim 12, wherein the first plurality of interwoven carbon fibers are carbon fibers having a smaller diameter than those in the second and third pluralities of carbon fibers.

14. A method comprising:
providing a fuzzy carbon fiber veil having a first surface and a second surface defined by a carbon fiber mat, wherein the fuzzy carbon fiber veil includes carbon nanotubes having longitudinal axes extending from the first and second surfaces in a direction substantially perpendicular to the first and second surfaces, wherein the carbon nanotubes are distributed throughout substantially the entirety of the first and second surfaces, wherein the carbon nanotubes are grown on the carbon fiber mat;
providing a first carbon fiber reinforcement layer;
positioning the fuzzy carbon fiber veil with respect to the first reinforcement layer such that at least a portion of the carbon nanotubes extending from the first surface protrude into the first carbon fiber reinforcement layer so as to maintain a relative positioning between the fuzzy carbon fiber veil and the first carbon fiber reinforcement layer without any chemical bonding therebetween;
providing a second carbon fiber reinforcement layer;
while the fuzzy carbon fiber veil is neither mechanically nor covalently fastened to the first reinforcement layer, positioning the fuzzy carbon fiber veil with respect to the second reinforcement layer such that at least a portion of the carbon nanotubes extending from the second surface protrude into the second carbon fiber reinforcement layer, wherein the carbon fiber mat is the only carbon fiber material separating the first and second carbon fiber reinforcement layers; and
curing a resin applied to one of the fuzzy carbon fiber veil, the first carbon fiber reinforcement layer, and the second carbon fiber reinforcement layer to form a composite material.

15. The method of claim 14, wherein the carbon fiber mat has a thickness between 100 microns and 150 microns, wherein the thickness is less than thicknesses of the first and second carbon fiber reinforcement layers.

16. The method of claim 14, wherein the carbon fiber mat is constructed of a first plurality of carbon fibers arranged in an interwoven pattern, wherein the first plurality of carbon fibers have a first cross-sectional area.

17. The method of claim 16, wherein first and second reinforcement layers are constructed of second and third pluralities of carbon fibers substantially parallel to one another, wherein the second and third pluralities of carbon fibers have cross-sectional areas greater than the first cross-sectional area.

18. The method of claim 14, wherein the fuzzy carbon fiber veil, the first carbon fiber reinforcement layer, and the second carbon fiber reinforcement layer form a first laminate assembly, wherein the method further comprises injecting the resin into the first laminate assembly via one of resin transfer, vacuum-assisted infusion, compression molding, and pultrusion.

19. The method of claim 18, wherein the method further comprises adding a plurality of additional laminate assemblies on either side of the first laminate assembly prior to curing the resin.

20. The method of claim 19, further comprising, prior to curing the resin, adding a plurality of successive carbon fiber reinforcement layers without fuzzy carbon fiber veils therebetween to create a region not containing carbon nanotubes within the composite material.

* * * * *